Patented Feb. 25, 1930

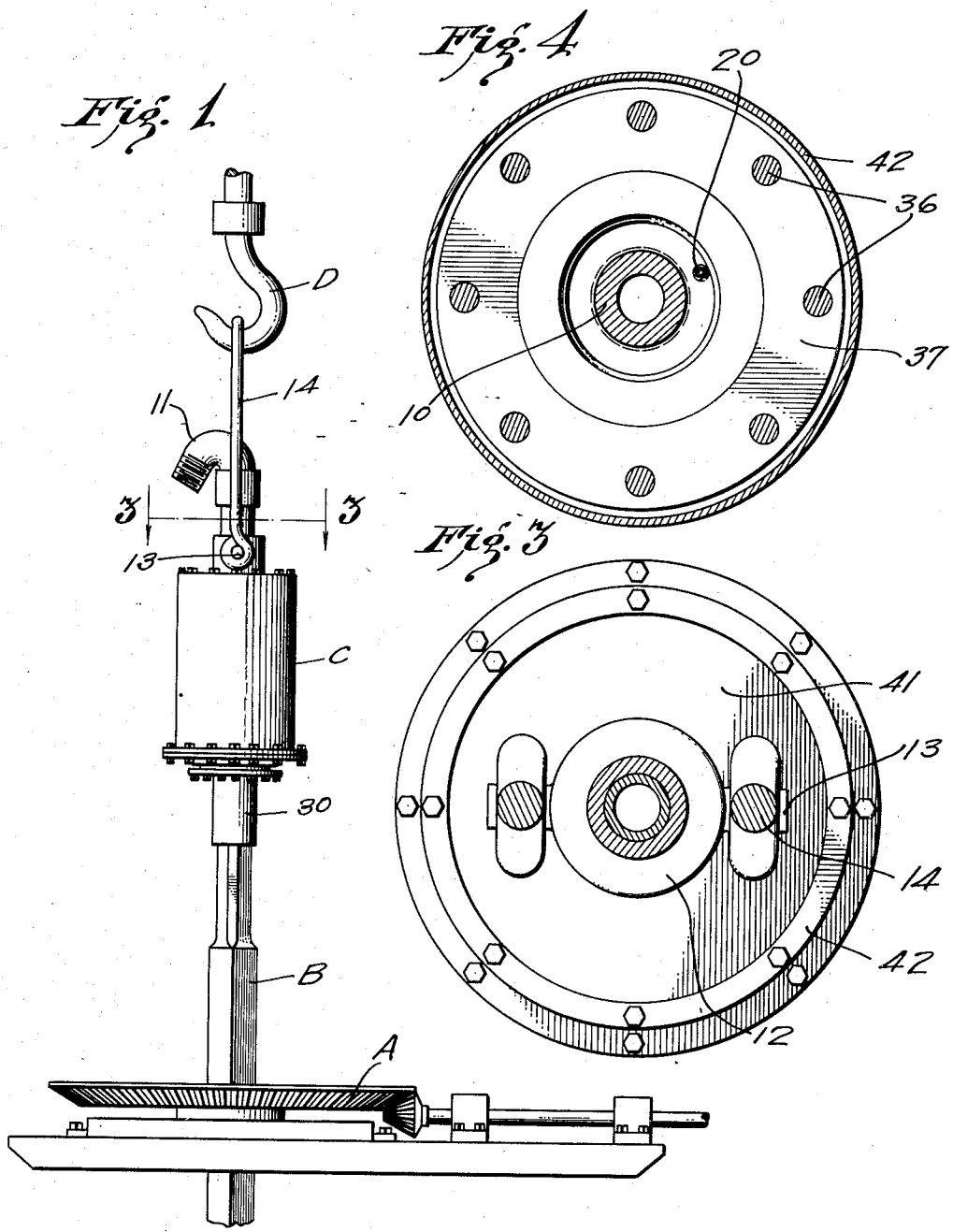

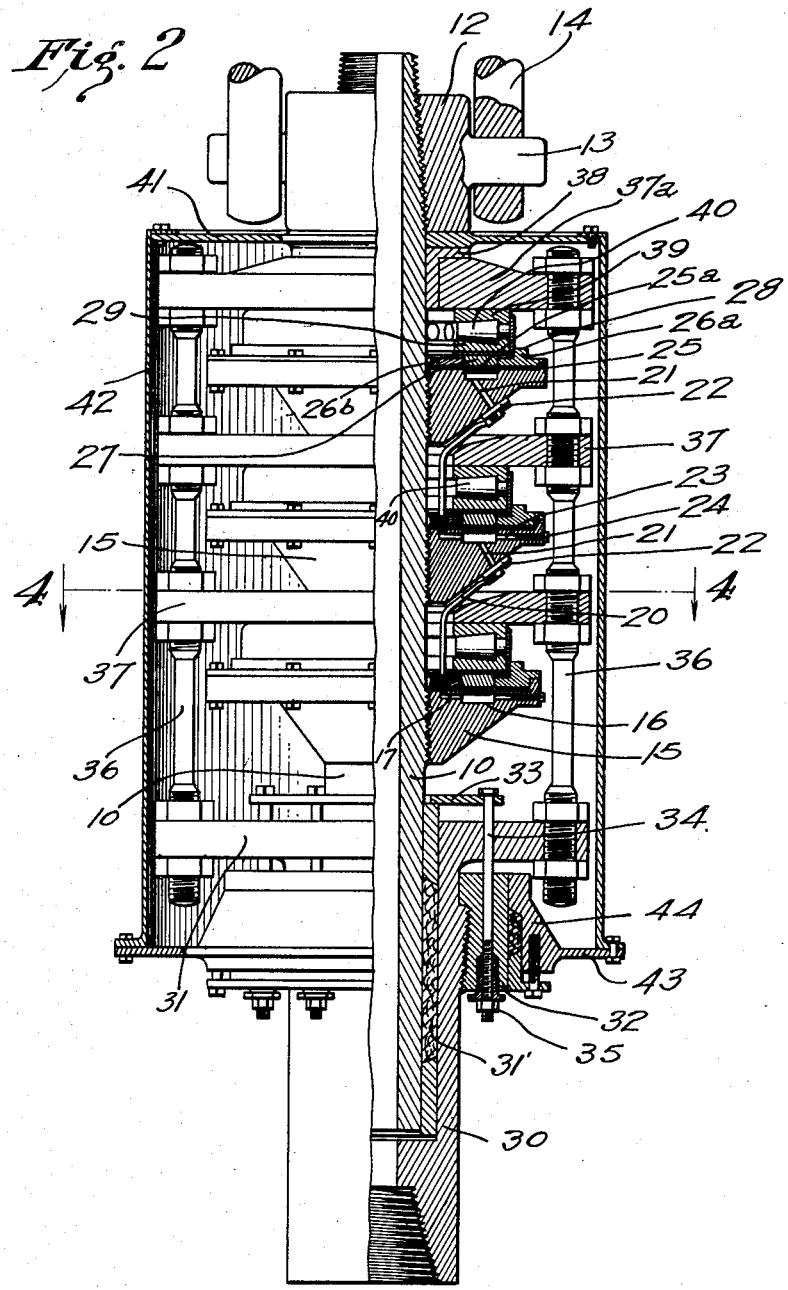

1,748,269

UNITED STATES PATENT OFFICE

JAMES A. WRAY, OF LOS ANGELES, CALIFORNIA

MULTIPLE-BEARING SWIVEL

Application filed April 9, 1929. Serial No. 353,810.

This invention relates to a swivel used to support drill pipes employed in hydraulic rotary drilling of wells and serving as a coupling between the drill pipes and a source of supply of circulation liquid. In such devices, a heavy load must be supported and a leak tight fit maintained between a rotating tubular member and a stationary member. Swivels are employed for this purpose, and obviously it is advantageous to have a swivel with freely rotating members. To this end, it is desirable to employ anti-friction bearings which take the thrust. Roller bearings have been found to meet the conditions in such swivels primarily because of their strength. However, a single group of roller bearings is hardly sufficiently strong to bear the thrust exerted on them in actual practice; they wear unduly and frequently crush. Replacement of the swivel must then be effected with resultant loss in time and increase in labor attended by other difficulties due to stoppage of circulation. In the production of a multiple thrust bearing swivel of the type described, nicety of adjustment is required to distribute the load between the several thrust bearings. In my copending application for swivels, Ser. No. 328,043, filed December 22, 1928, means is shown for effecting such adjustment. However, it has been found that equalization of the thrust distributed between the thrust bearings can be more effectively obtained by hydraulic equalizing means interposed between the members of each thrust bearing.

The objects of this invention are to provide a swivel having any or all of the following features: a multiplicity of thrust bearings so disposed as to distribute the load between bearings; fluid equalizing means to equalize the thrust on the bearings; an encased system of thrust bearings so that they may travel in a bath of lubricant; and details of structure contributing to strength, compactness and efficiency.

These objects, together with other objects and corresponding accomplishments, are obtained by means of the embodiment of my invention illustrated in the accompanying drawings, in which:—

Fig. 1 is an elevation of a rotary table, drill stem and swivel in assembled relation; Fig. 2 is a vertical section partly in an elevation through a swivel; Fig. 3 is a section as seen on the line 3—3 of Fig. 1; and Fig. 4 is a section as seen on the line correspondingly numbered in Fig. 2.

Referring more particularly to Fig. 1, A marks a rotary table through which a drill drive stem B passes. The drive stem and parts will together with the drill pipe and tools form a portion of the drill string. The drill string B is supported by a swivel C, the latter being suspended by a hook D and supported in any suitable manner in the usual derrick, not shown.

Referring with more particularity to the swivel, it comprises a central tubular member 10 threaded at the upper end so that it may be connected to a goose neck 11 and threaded intermediate its ends to receive members of thrust bearings. It will be noted that the threaded portions are tapered and of increasing diameter from top to bottom to provide for convenience of assembly. Mounted upon the upper end of tubular member 10 is a collar 12 having trunnions 13 to receive the eyes of a bail 14 by means of which the swivel is supported upon hook D. The goose neck 11 is adapted to be connected to a flexible hose, not shown, leading from a source of supply of circulation fluid, a mud pump being commonly used for that purpose.

Secured by threads upon the tubular member 10 are thrust bearing disks or blocks 15. Obviously, the blocks 11 may be adjusted as to their relative positions upon the tubular stem 10. Each block has an upper substantially flat face and an annular recess 16 which serves as a hydraulic chamber. A passage 17 communicates with chamber 16 and is adapted to have connected thereto a flexible tubing 20. This tubing may be copper tubing. In the construction shown, there are three thrust bearing blocks shown. However, the invention is not limited to any specific number of blocks. Each block has a passage 17, while the top and intermediate blocks are provided with additional passages 21. These additional passages serve for connection to the tubing 20 by means of couplings 22 of any suitable construction. Thus, the hydraulic chambers are interconnected. The intermediate block has a third passage 23 leading to the periphery of the blocks and being threaded to receive a plug 24. Each block has mounted over its upper face a disk 25 preferably formed of some flexible sheet metal having annular beads to register with chamber 16, thereby forming a flexible diaphragm portion 25ª. The disk 25 is hereafter termed a diaphragm and may rest loosely upon the face of the thrust block or if desired may be fastened at the edges. Resting on the disk or diaphragm 25 are a pair of concentric spacer rings 26ª and 26ᵇ so as to provide an intermediate space registering with the expansible chamber 25. Disposed between the rings is a follower ring 27 of greater thickness than the rings 26ª and 26ᵇ, so that when the bottoms of the rings are on the same level, the follower ring will be slightly above the upper surface of the spacing rings 26ª and 26ᵇ. Ring 26ª has an annular rib 28 and disposed over the spacing rings and the following ring is a roller bearing race member 29.

The drill pipe string is secured to a tubular member 30 having a collar 31. A packing recess is provided to form a portion of a stuffing box indicated generally by 31. This stuffing box forms a rotatable leak tight fit with the tubular member 10. The tubular member 30 has an annular projection threaded to receive a nut 32. In order to adjust the stuffing box, a ring plate 33 is mounted upon the gland and adjusting stems 34 are secured thereto and slidably extend through the nut 32, there being suitable packing to insure a leak tight fit and adjusting nuts 35 so that the adjustment of the packing in stuffing box 31 may be made from the outside of the swivel.

Mounted in openings in the collar 31 are rods 36. The rods have threaded portions to receive nuts between which are supported ring disks 37. At the upper end of the rod is a ring disk 37ª. Disks 37 have openings at the center to accommodate the tubing 20. Ring disk 37ª has an opening to receive a bushing 38 for a purpose later described. Upper race members for roller bearings are marked 39 and disposed to cooperate with the roller bearing race members 29. Suitable tapered rollers 40 are mounted between the race members.

Disposed over the bushing 38 so as to engage therewith is a casing head 41 to which is secured a cylindrical shell 42. At the lower end is a head 43, there being a stuffing box 44 between the nut 32 and the head 43 arranged so that its gland may be adjusted from the outside of the casing formed by the heads and the shell.

In the operation of the device, the parts are assembled as shown in Fig. 2. A liquid of a suitable nature such as glycerine is introduced into the expansible equalizing chambers 16 and their cooperating passages by way of passage 23, plug 24 being removed for this purpose. Enough liquid is introduced so that the diaphragms are displaced to raise the follower blocks 27 and support the lower race members 29 thereon. If for any reason, the blocks are not projected sufficiently to support the lower race members, the latter will rest upon the spacing rings 26ª and 26ᵇ without injury to the device. The plug 24 may be used for the purpose of adjusting the projection of the blocks. By inserting the plug further into the passages 23, the diaphragms will be further expanded. After the hydraulic liquid has been introduced into the equalizing chambers and passages, the housing is assembled, and filled with a lubricant, so that the bearings will rotate in the lubricant bath. It will be noted that the load suspended from the tubular member 30 is transmitted to tubular member 10 by means of three sets of thrust bearings, thereby distributing the load. Adjustment of the thrust bearings may be made by adjustment of the position of ring disks 37 and 37ª, the blocks 15 or both. Any tendency to unequal distribution of the load between the several thrust bearings will be automatically taken care of by the equalizing device. Circulation fluid is introduced into the member 10 under a high pressure. In order for fluid to leak from the swivel, it must pass through the stuffing box 31, into the housing and then through the stuffing box 44 to the outside. Thus, leakage is effectively prevented.

What I claim is:—

1. A swivel comprising a tubular member adapted to be connected to a source of fluid supply, a tubular member rotatably connected to said first mentioned tubular member and adapted to support a load, a plurality of pairs of coacting thrust bearing members, one member of each pair of thrust bearing members being secured to one of said tubular members and the other member of each pair being secured to the other tubular member, and fluid equalizing devices interposed between said thrust bearing members, said fluid equalizing devices being freely in communication with one another, whereby to provide multiple sets of thrust bearing members, all resisting longitudinal movement of said tubular members in relation to one another with equalization of thrust on said thrust bearing members.

2. A swivel comprising a tubular member adapted to be connected to a source of fluid supply, a tubular member rotatably connected to said first mentioned tubular member and adapted to support a load, a plurality of pairs of coacting thrust bearing members, one member of each pair of thrust bearing members being secured to one of said tubular members and the other member of each pair being secured to the other tubular member, and fluid equalizing expansible chambers interposed between said thrust bearing members, said fluid equalizing expansible chambers being freely in communication with one another, whereby to provide multiple sets of thrust bearing members, all resisting longitudinal movement of said tubular members in relation to one another with equalization of thrust on said thrust bearing members.

3. A swivel comprising a tubular member adapted to be connected to a source of fluid supply, a tubular member rotatably connected to said first mentioned tubular member and adapted to support a load, a plurality of thrust bearings comprising pairs of races, one race of each thrust bearing being secured to one of said tubular members and the other race of each pair being secured to the other tubular member, and fluid equalizing devices interposed between the races of each thrust bearing, said fluid equalizing devices being freely in communication with one another, whereby to provide multiple sets of thrust bearings, all resisting longitudinal movement of said tubular members in relation to one another with equalization of thrust on said thrust bearings.

4. A swivel comprising a tubular member adapted to be connected to a source of fluid supply, a tubular member rotatably connected to said first mentioned tubular member and adapted to support a load, a plurality of thrust bearings comprising pairs of coacting races, one race of each thrust bearing being secured to one of said tubular members and the other race of each pair being secured to the other tubular member, and fluid equalizing expansible chambers interposed between the races of each thrust bearing, said fluid equalizing expansible chambers being freely in communication with one another, whereby to provide multiple sets of thrust bearings, all resisting longitudinal movement of said tubular members in relation to one another with equalization of thrust on said thrust bearings.

5. A swivel comprising a tubular member adapted to be connected to a source of fluid supply, a tubular member rotatably connected to said first mentioned tubular member and adapted to support a load, a plurality of coacting thrust bearings comprising pairs of races, one race of each thrust bearing being secured to one of said tubular members, a collar secured to the other tubular member, rods extending from said collar, the other races of said thrust bearings being supported on said rods and fluid equalizing devices interposed between the races of each thrust bearing, said fluid equalizing devices being freely in communication with one another, whereby to provide multiple sets of thrust bearings, all resisting longitudinal movement of said tubular members in relation to one another with equalization of the thrust on said thrust bearings.

6. A swivel comprising a tubular member adapted to be connected to a source of fluid supply, a tubular member rotatably connected to said first mentioned tubular member and adapted to support a load, a plurality of pairs of coacting thrust bearings comprising pairs of races, one race of each thrust bearing being secured to one of said tubular members, a collar secured to the other tubular member, rods extending from said collar, the other races of said thrust bearings being supported on said rods and fluid equalizing expansible chambers interposed between the races of each thrust bearing, said fluid equalizing expansible chambers being freely in communication with one another, whereby to provide multiple sets of thrust bearings, all resisting longitudinal movement of said tubular members in relation to one another with equalization of the thrust on said thrust bearings.

7. A swivel comprising a tubular member adapted to be connected to a source of fluid supply, a tubular member rotatably connected to first mentioned member and adapted to support a load, a stuffing box packing the joints between said members, a plurality of thrust bearings comprising pairs of coacting races, one race of each pair being secured to one of said tubular members and the other race of each pair being secured to the other tubular member, rollers disposed between each pair of races whereby to provide multiple sets of thrust bearings, fluid equalizing devices interposed between the races of each thrust bearing, said fluid equalizing devices being freely in communication with one another all resisting relative longitudinal movement of said tubular members with equalization of thrust between thrust bearings, and a casing for lubricant enclosing said thrust bearings and said stuffing box.

8. A swivel comprising a tubular member adapted to be connected to a source of fluid supply, a tubular member rotatably connected to first mentioned member and adapted to support a load, a stuffing box packing the joints between said members, a plurality of thrust bearings comprising pairs of coacting races, one race of each pair being secured to one of said tubular members and the other race of each pair being secured to the other tubular member, rollers disposed between each pair of races whereby to provide multiple sets of thrust bearings, fluid expansible chambers interposed between the races of each thrust bearing, said fluid expansible chambers being freely in communication with one another and forming equalizing devices, all resisting relative longitudinal movement of said tubular members with equalization of thrust between thrust bearings, and a casing for lubricant enclosing said bearings and said stuffing box.

In witness that I claim the foregoing I have hereunto subscribed my name this 28th day of March, 1929.

JAMES A. WRAY.